(12) United States Patent
Barac et al.

(10) Patent No.: US 12,363,597 B2
(45) Date of Patent: Jul. 15, 2025

(54) METHODS AND RADIO NETWORK NODES FOR HANDLING COMMUNICATION

(71) Applicant: Telefonaktiebolaget LM Ericsson (publ), Stockholm (SE)

(72) Inventors: Filip Barac, Huddinge (SE); Jose Luis Pradas, Stockholm (SE); Paul Schliwa-Bertling, Ljungsbro (SE); Ajmal Muhammad, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 418 days.

(21) Appl. No.: 17/924,768

(22) PCT Filed: May 27, 2021

(86) PCT No.: PCT/SE2021/050495
§ 371 (c)(1),
(2) Date: Nov. 11, 2022

(87) PCT Pub. No.: WO2021/242168
PCT Pub. Date: Dec. 2, 2021

(65) Prior Publication Data
US 2023/0189096 A1    Jun. 15, 2023

Related U.S. Application Data

(60) Provisional application No. 63/031,009, filed on May 28, 2020.

(51) Int. Cl.
*H04W 36/00*    (2009.01)
(52) U.S. Cl.
CPC . *H04W 36/00837* (2018.08); *H04W 36/0016* (2013.01); *H04W 36/0033* (2013.01); *H04W 36/0064* (2023.05)

(58) Field of Classification Search
CPC ....... H04W 36/00837; H04W 36/0064; H04W 36/0016; H04W 36/003
(Continued)

(56) References Cited

U.S. PATENT DOCUMENTS 8,355,732 B2 * 1/2013 Gabriel ................. H04W 24/00
455/446
8,774,759 B2 * 7/2014 He .................... H04W 36/0038
455/410
(Continued)

FOREIGN PATENT DOCUMENTS

EP    2214360 A1    8/2010
EP    2683183 A1    1/2014
(Continued)

OTHER PUBLICATIONS

"3GPP TS 33.401 V16.2.0", 3rd Generation Partnership Project; Technical Specification Group Services and System Aspects; 3GPP System Architecture Evolution (SAE); Security architecture (Release 16), Mar. 2020, pp. 1-167.
(Continued)

*Primary Examiner* — Anthony Mejia
(74) *Attorney, Agent, or Firm* — Murphy, Bilak & Homiller, PLLC

(57) ABSTRACT

Embodiments herein relate to, for example, a method performed by a source radio network node (140), for handling communication in a wireless communications network, wherein the source radio network node is adapted to relay data packets between a first radio network node and a UE in the wireless communications network. The source radio network node (140) transmits to a target radio network node (150,12,15) a message relating to a cell selection and/or a handover for the UE, wherein the message comprises a first user plane indication, and wherein the first user plane
(Continued)

indication is an indication of setting up a user plane communication or not for the UE.

21 Claims, 11 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 10,104,582 | B2* | 10/2018 | Yoshizawa | ........ H04W 36/0016 |
| 2010/0265912 | A1* | 10/2010 | Mildh | ................ H04W 56/001 |
| | | | | 370/331 |
| 2010/0297998 | A1 | 11/2010 | Hapsari et al. | |
| 2016/0142955 | A1* | 5/2016 | Hedberg | ............. H04W 12/062 |
| | | | | 370/331 |
| 2020/0145952 | A1* | 5/2020 | Keskitalo | ............ H04W 56/007 |
| 2020/0229261 | A1* | 7/2020 | Jung | ..................... H04W 24/10 |
| 2023/0026417 | A1* | 1/2023 | Thantharate | .......... H04W 36/08 |

FOREIGN PATENT DOCUMENTS

| | | |
|---|---|---|
| WO | 200957684 A1 | 5/2009 |
| WO | 2019214709 A1 | 11/2019 |
| WO | 2020032127 A1 | 2/2020 |
| WO | 2020067736 A1 | 4/2020 |
| WO | 2020101561 A1 | 5/2020 |

OTHER PUBLICATIONS

"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.

"3GPP TS 36.413 V16.0.0", 3rd Generation Partnership Project; Technical Specification Group Radio Access Network; Evolved Universal Terrestrial Radio Access Network (E-UTRAN); S1 Application Protocol (S1AP) (Release 16), Dec. 2019, pp. 1-210.

"3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, pp. 1-130.

"3GPP TS 38.331 V15.9.0", 3rd Generation Partnership Project; Technical Specification Group Radio Access Network; NR; Radio Resource Control (RRC) protocol Specification (Release 15), Mar. 2020, pp. 1-536.

"3GPP TS 38.401 V15.7.0", 3rd Generation Partnership Project; Technical Specification Group Radio Access Network; NG-RAN; Architecture description (Release 15), Dec. 2019, pp. 1-47.

"3GPP TS 38.413 V16.1.0", 3rd Generation Partnership Project; Technical Specification Group Radio Access Network; NG-RAN; NG Application Protocol (NGAP) (Release 16), Mar. 2020, pp. 1-26.

"Baseline CR for introducing Rel-16 NR mobility enhancement", 3GPP TSG-RAN WG3 Meeting #107bis-e, R3-201587, Electronic Meeting, Apr. 20-30, 2020, pp. 1-12.

"BL CR to 38.401 Support for IAB", 3GPP TSG RAN WG3 Meeting #108-e, R3-203067, Online, 1-22, Jun. 1-11, 2020, pp. 1-23.

"BL CR to 38.401 Support for IAB", 3GPP TSG RAN WG3 Meeting #107bis-e, R3-201597, E-meeting, Apr. 20-30, 2020, pp. 1-10.

"QoS Management of IAB nodes", 3GPP TSG-RAN WG3#101, R3-184867, Gothenburg, Sweden, Aug. 20-24, 2018, pp. 1-8.

"3GPP TR 38.874 0.7.0", 3rd Generation Partnership Project; Technical Specification Group Radio Access Network; Study on Integrated Access and Backhaul; (Release 15), Nov. 2018, pp. 1-111.

"3GPP TS 23.401 V16.0.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2018, pp. 1-410.

"3GPP TS 36.423 V16.1.0", 3rd Generation Partnership Project; Technical Specification Group Radio Access Network; Evolved Universal Terrestrial Radio Access Network (E-UTRAN); X2 application protocol (X2AP) (Release 16), Mar. 2020, pp. 1-438.

"3GPP TS 38.423 V16.1.0", 3rd Generation Partnership Project; Technical Specification Group Radio Access Network; NG-RAN; Xn application protocol (XnAP) (Release 16), Mar. 2020, pp. 1-334.

Ericsson, (TP for NR-IAB BL CR for TS 38.423): Corrections to BL CR, 3GPP TSG-RAN WG3 Meeting #108-e, R3-203816, Online, Jun. 1-11, 2020.

* cited by examiner

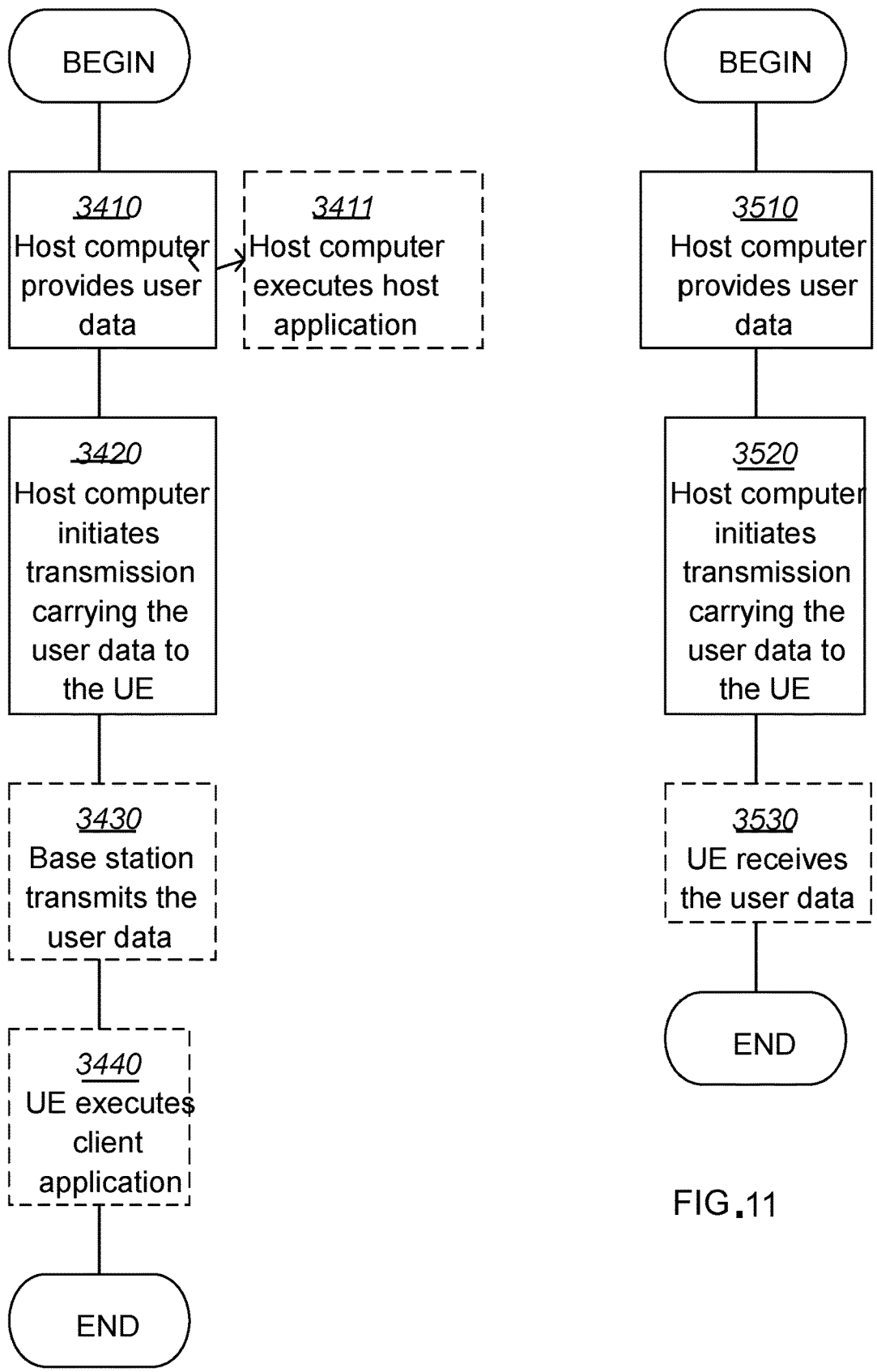

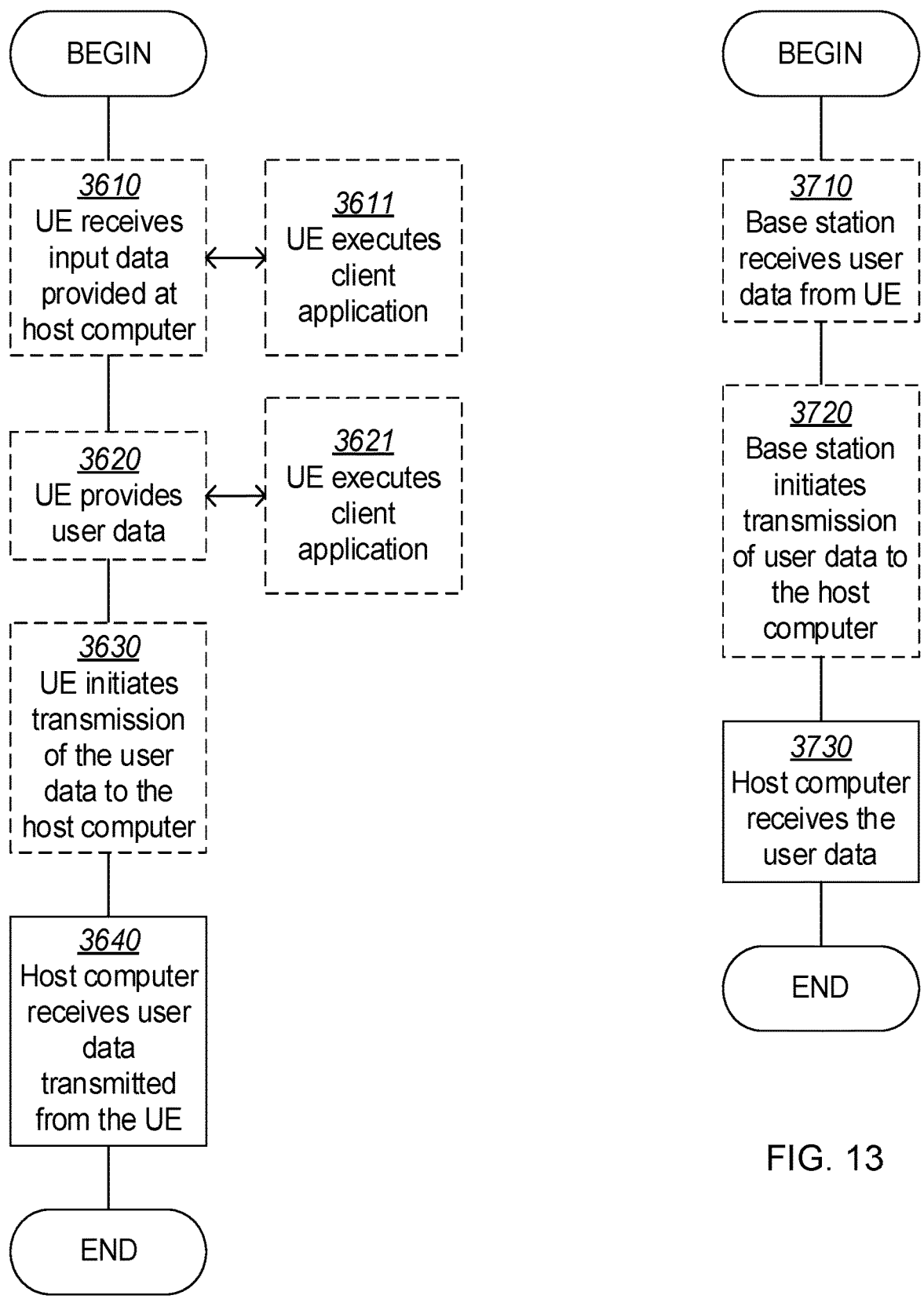

METHODS AND RADIO NETWORK NODES FOR HANDLING COMMUNICATION

TECHNICAL FIELD

Embodiments herein relate to a source and a target radio network node such as integrated access and wireless access backhaul (IAB)-nodes, and methods performed therein regarding wireless communication. Furthermore, a computer program product and a computer-readable storage medium are also provided herein. In particular, embodiments herein relate to handling communication, such as controlling/managing setup of communication or connection during handover or cell selection, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Next generation systems are expected to support a wide range of use cases with varying requirements ranging from fully mobile devices to stationary internet of things (IoT) or fixed wireless broadband devices. The traffic pattern associated with many use cases may be expected to consist of short or long bursts of data traffic with varying length of waiting period in between, here called inactive state. In NR, both license assisted access and standalone unlicensed operation are to be supported. Hence the procedure of Physical Random Access Channel (PRACH) transmission and/or Scheduling Request (SR) transmission in unlicensed spectrum may be investigated in 3GPP.

3GPP is studying potential solutions for efficient operation of integrated access and wireless access backhaul (IAB) in NR, also Integrated Access and Backhaul for short. In the context of IAB there are two kinds of nodes that are identified as components of a RAN:

IAB-node: RAN node that supports wireless access to UEs and wirelessly backhauls the access traffic.

IAB-donor: An IAB node i.e. RAN node which provides UE's interface to core network and wireless backhauling functionality to IAB nodes.

IAB strives to reuse existing functions and interfaces defined for access. In particular, Mobile-Termination (MT), gNB-Distributed Unit (DU), gNB-Central Unit (CU), User Plane Function (UPF), Access and Mobility Management Function (AMF) and Session Management Function (SMF) as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined as a component of the Mobile Equipment. In the context of this study, MT is referred to as a function residing on an IAB-node that terminates the radio interface layers of the backhaul Uu interface toward the IAB-donor or other IAB-nodes.

FIG. 1 shows a reference diagram for IAB-architectures (see 3gpp TR 38.874 v0.7.0) in standalone mode, which contains one IAB-donor and multiple IAB-nodes. The IAB-donor may be treated as a single logical node that comprises a set of functions such as gNB-DU, gNB-CU-control plane (CP), gNB-CU-user plane (UP) and potentially other functions. In a deployment, the IAB-donor may be split according to these functions, which may all be either collocated or non-collocated as allowed by 3GPP NG-RAN architecture. IAB-related aspects may arise when such split is exercised. Also, some of the functions presently associated with the IAB-donor may eventually be moved outside of the IAB-donor in case it becomes evident that they do not perform IAB-specific tasks.

In EPS, a Mobility Management Entity (MME) may only provide Security keys and UE security capability towards RAN when the MME requests the UE context establishment in RAN along with the user plane (UP) setup for session, i.e. only the following S1AP message (as disclosed in 3gpp TS 36.413 v.16.0.0) may carry the security related information.

Section 9.1.4.1 INITIAL CONTEXT SETUP REQUEST of 3gpp TS 36.413 v16.0.0 discloses the S1AP message carrying the security related information according to the below.

This message is sent by the MME to request the setup of a UE context.

Direction: MME→eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 . . . <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.1.80 | | YES | ignore |
| >>SIPTO Correlation ID | O | | Correlation ID 9.2.1.80 | | YES | ignore |
| >>BearerType | O | | 9.2.1.116 | | YES | reject |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Additional CS Fallback Indicator | C-ifCSFBhighpriority | | 9.2.3.37 | | YES | ignore |
| Masked IMEISV | O | | 9.2.3.38 | | YES | ignore |
| Expected UE Behaviour | O | | 9.2.1.96 | | YES | ignore |
| ProSe Authorized | O | | 9.2.1.99 | | YES | ignore |

| IE/Group Name | Presence | Range | IE type and reference | Semantics description | Criticality | Assigned Criticality |
|---|---|---|---|---|---|---|
| UE User Plane CIoT Support Indicator | O | | 9.2.1.113 | | YES | ignore |
| V2X Services Authorized | O | | 9.2.1.120 | | YES | ignore |
| UE Sidelink Aggregate Maximum Bit Rate | O | | 9.2.1.122 | This IE applies only if the UE is authorized for V2X services. | YES | ignore |
| Enhanced Coverage Restricted | O | | 9.2.1.123 | | YES | ignore |
| NR UE Security Capabilities | O | | 9.2.1.127 | | YES | ignore |
| CE-mode-B Restricted | O | | 9.2.1.129 | | YES | ignore |
| Aerial UE subscription information | O | | 9.2.1.136 | | YES | ignore |
| Pending Data Indication | O | | 9.2.3.55 | | YES | ignore |
| Subscription Based UE Differentiation Information | O | | 9.2.1.140 | | YES | ignore |
| Additional RRM Policy Index | O | | 9.2.1.39a | | YES | ignore |

When there is no need to establish UP, e.g. for control plane (CP) IoT optimization where data is sent over non-access stratum (NAS) message without using the UP, RAN is not required to establish UE context and no access stratum (AS) security protection and MME will not provide security related info as in the above message. See below S1AP message from 3gpp TS 36.413 v.16.0.0 where the MME only asks RAN to setup the connection for NAS transport during attach.

Section 9.1.4.20 CONNECTION ESTABLISHMENT INDICATION of 3gpp TS 36.413 v.16.0.0 discloses the S1AP message.

This message is sent by the MME to complete the establishment of the UE-associated logical S1-connection.

Direction: MME→eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Radio Capability | O | | 9.2.1.27 | | YES | ignore |
| Enhanced Coverage Restricted | O | | 9.2.1.123 | | YES | ignore |
| DL CP Security Information | O | | 9.2.3.49 | | YES | ignore |
| CE-Mode-B Restricted | O | | 9.2.1.129 | | YES | ignore |
| End Indication | O | | 9.2.3.54 | | YES | ignore |
| Subscription Based UE Differentiation Information | O | | 9.2.1.140 | | YES | ignore |
| UE Level QoS Parameters | O | | E-RAB Level QoS Parameters 9.2.1.15 | Includes QoS parameters. | YES | ignore |

However, with the introduction of IAB-nodes (See 3gpp TS 23.401 v.16.0.0 clause 4.3.32), the IAB-MT/UE part of the IAB-node needs to be registered in the core network using UE procedure first, and a secure connection between the IAB-node and the IAB donor node is needed. IAB-MT/UE meaning a node that terminates the radio interface layers of the backhaul interface toward the IAB-donor or other IAB-nodes.

For IAB nodes, Data Radio Bearers (DRB) are only needed to connect an IAB node with the operation, administration and maintenance (OAM) system. There are also other methods to connect to OAM such as Backhaul Radio Link Channel (BH RLC Channel). Connection through DRBs was agreed by RAN3 to be optional, for instance, the IAB Base Line (BL) Change Request (CR) for 3gpp TS 38.401 in clause 8.2.x on IAB node migration states the following:

The IAB-donor-CU sends a UE CONTEXT SETUP REQUEST message to a target parent node IAB-DU, to create a UE context for migrating an IAB-MT and set up one or more bearers. These bearers can be used by the migrating IAB-MT for its own signalling, and, optionally, data traffic.

SUMMARY

The IAB-MT/UE may provide a full and complete set of functionalities fulfilling all IAB-node specific requirements without at the same time supporting UP.

To operate in Access Stratum in a secure manner, i.e. using encryption and integrity protection, requires that for a given IAB-MT/UE when becoming connected to the network over the user plane (UP), the MME provides the Security Key information to the eNodeB that this IAB-MT/UE connects to on Access Stratum.

The purpose of IAB-MT/UE establishing a packet data network (PDN) Connection is for the IAB-MT/UE to download the OAM configuration, e.g. parameters for the cells configured at the IAB-DU, which may also include the IP address(es) allocated to the IAB-node. However, the IAB specifications, such as R3-201597 IAB BL CR for TS 38.401, allow alternative ways to enable OAM connectivity, other than via PDN Connection, and IP address allocation other than via OAM. For example, an IAB-node may alternatively establish the OAM connection via backhaul connectivity and/or it can receive IP address(es) from the IAB-donor. Hence, the establishment of the PDN Connection, i.e. the UP connection, for an IAB-MT/UE is not mandatory.

In working groups for RAN2 and RAN3 it has been agreed that the establishment of UP by an IAB-MT is optional. In RAN3 specifications, the procedures for legacy UE handover, addition of secondary node, and UE context management are reused to enable IAB-MT context management, secondary node addition and handover, thus, the IAB-MT is treated like a UE. However, in some of these legacy messages reused for the IAB-MT, the presence of information elements (IE) related to user plane establishment is mandatory, which contradicts the above-mentioned agreement. One example of the consequence of keeping these mandatory user plane related IEs is that, if an IAB-MT does not have any protocol data unit (PDU) sessions established, it is not possible to hand over the IAB-MT over X2 or Xn.

The relevant specifications and messages are as follows:
TS 36.413: the messages used in the Handover Resource Allocation and Initial Context Setup S1AP procedures;
TS 38.413: the messages used in the Handover Preparation and Handover Resource Allocation NGAP procedures;
TS 36.423: the messages used in the Handover Preparation, SeNB Addition Preparation, Retrieve UE Context and SgNB Addition Preparation X2AP procedures;
TS 38.423: the messages used in the Handover Preparation and S-NG-RAN node Addition Preparation XnAP procedures.

It should be noted that there exist additional messages in the above specifications where the UP-related IEs are mandatory, but these procedures as such are inherent to UP establishment and are hence not relevant for the problem at hand.

It has previously been disclosed a method to enable the establishment of CP connection security for the IAB-MT, without establishing the UP connection. The present disclosure handles a problem of executing the handover and/or secondary node addition without establishment of a user plane connection. Embodiments herein also propose a concrete signaling solution for the problem at hand.

An object herein is to provide a mechanism to enable communication, e.g. handle or manage handover or cell selection of a UE, in a secure manner in a wireless communications network.

According to an aspect the object is achieved, according to embodiments herein, by providing a method performed by a source radio network node, for handling communication in a wireless communications network, wherein the source radio network node is adapted to relay data packets between a first radio network node and a UE in the wireless communications network. The UE transmits to a target radio network node a message relating to a cell selection and/or a handover for the UE, wherein the message comprises a first UP indication, wherein the first user plane indication is an indication of setting up a user plane communication or not for the UE.

According to another aspect the object is achieved, according to embodiments herein, by providing a method performed by a target radio network node for handling communication in a wireless communications network. The wireless communications network comprises a source radio network node relaying data packets between a first radio network node and a UE. The target radio network node receives from the source radio network node or the first radio network node a message relating to a cell selection or a handover for the UE, wherein the message comprises a first user plane indication, wherein the first user plane indication is an indication of setting up a user plane communication or not for the UE. The target radio network node further performs a setup of a connection for the UE based on the first user plane indication. For example, the target radio network node may perform a setup of a connection for the UE based on the first UP indication e.g. will not setup the user plane, e.g. it will simply ignore the information related to user plane resources when the first UP indication indicates non-UP setup.

According to another aspect of embodiments herein, the object is achieved by providing a source radio network node for handling communication in a wireless communications network, wherein the source radio network node is adapted to relay data packets between a first radio network node and a UE in the wireless communications network. The source radio network node is configured to transmit to a target radio network node a message relating to a cell selection and/or a handover for the UE, wherein the message comprises a first UP indication, wherein the first UP indication is an indication of setting up a user plane communication or not for the UE.

According to another aspect of embodiments herein, the object is achieved by providing a target radio network node, such as an IAB node, for handling or managing communication in a wireless communications network. The wireless communications network comprises a source radio network node relaying data packets between a first radio network node and a UE. The target radio network node is configured to receive from the source radio network node or the first radio network node a message relating to a cell selection or a handover for the UE, wherein the message comprises a first UP indication, wherein the first user plane indication is an indication of setting up a user plane communication or not for the UE. The target radio network node is further configured to perform a setup of a connection for the UE based on the first user plane indication. The message may comprise the first UP indication indicating not to use UP setup. The radio network node may then be configured to perform the setup of a connection for the UE based on the first UP indication e.g. will not setup the user plane, or it will simply ignore the information related to user plane resources.

It is furthermore provided herein a computer program product comprising instructions, which, when executed on at least one processor, cause the at least one processor to carry out the method above, as performed by the source and the target radio network node, respectively. It is additionally provided herein a computer-readable storage medium, having stored thereon a computer program product comprising instructions which, when executed on at least one processor, cause the at least one processor to carry out the method according to the method above, as performed by the source and the target radio network node, respectively.

Embodiments herein introduce a solution with minimum impact to enable IAB-MT operation without having to set up a user plane connection for the IAB-MT i.e. PDU sessions and DRBs for the UE in case of NG-RAN and E-RABs for the UE in case of E-UTRAN. Embodiments herein avoid an unnecessary establishment of user plane connection for a UE such as an IAB-MT. This allows saving resources and memory in the IAB node as well as in the core network and reducing complexity. Additionally, it allows using legacy UE messages and minimizes changes to present technology such as changes of the Abstract Syntax Notation One (ASN.1). Thus, embodiments herein manage handover or cell selection of the UE, in a secure and efficient manner.

BRIEF DESCRIPTION OF THE DRAWINGS

Embodiments will now be described in more detail in relation to the enclosed drawings, in which:

FIG. 10 are methods implemented in a communication system including a host computer, a base station and a user equipment in accordance with some embodiments;

FIG. 11 are methods implemented in a communication system including a host computer, a base station and a user equipment in accordance with some embodiments;

FIG. 12 are methods implemented in a communication system including a host computer, a base station and a user equipment in accordance with some embodiments; and FIG. 13 are methods implemented in a communication system including a host computer, a base station and a user equipment in accordance with some embodiments.

DETAILED DESCRIPTION

Figure 1:
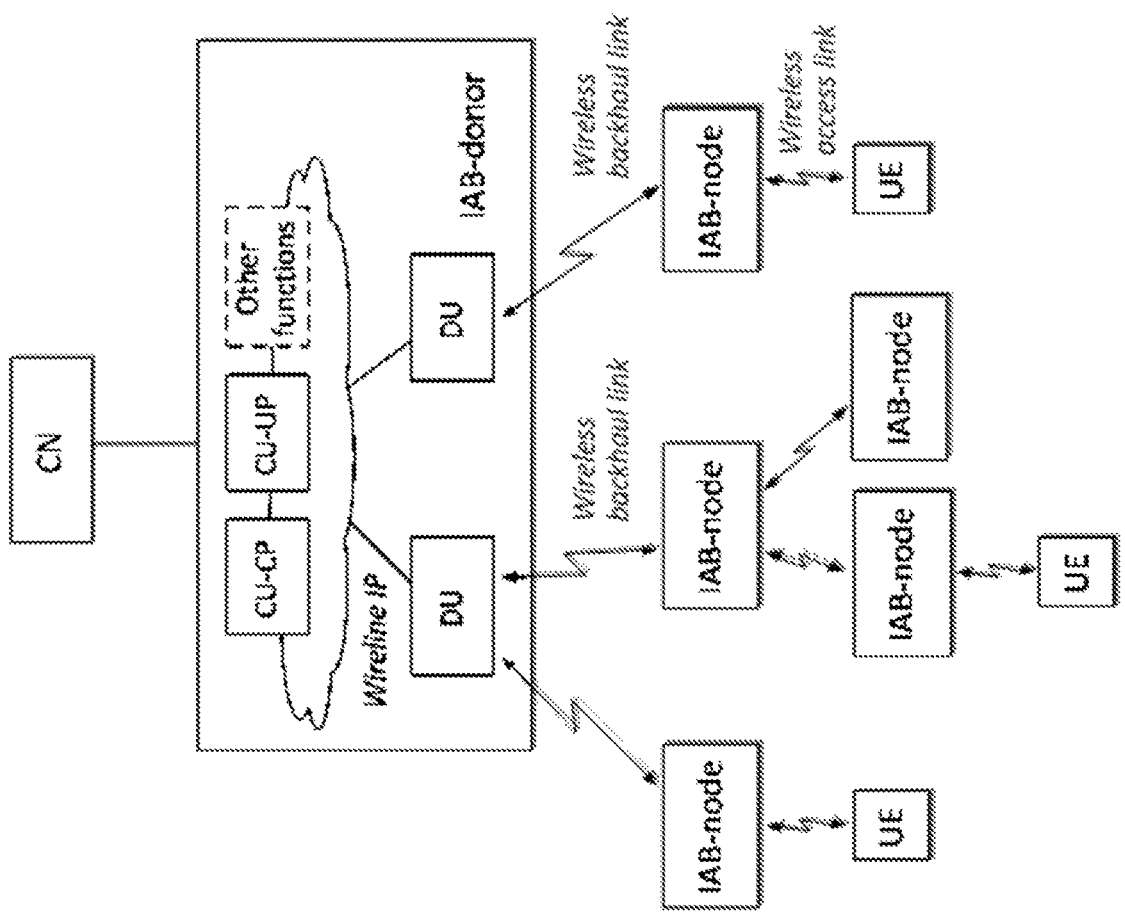
FIG. 1 is a reference diagram depicting IAB-architectures.
Figure 2:
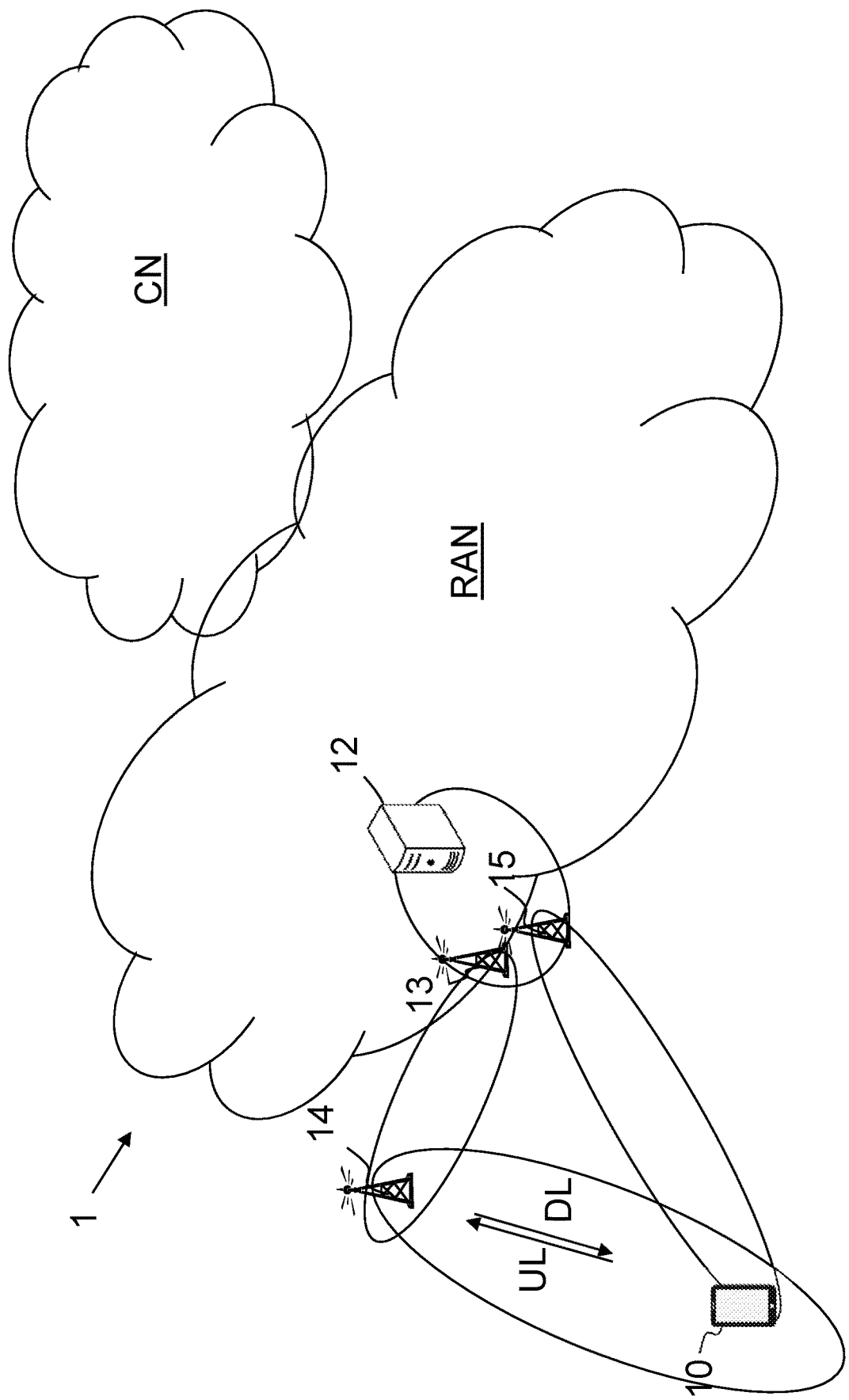
FIG. 2 is a schematic overview depicting a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 such as a mobile station, an IAB-MT, a non-access point (non-AP) STA, a STA, a wireless device and/or a wireless terminal, is comprised communicating via e.g. one or more Access Networks (AN), e.g. RAN, to one or more core networks (CN). It should be understood by the skilled in the art that "UE" is a non-limiting term which means any terminal, wireless communications terminal, IAB-MT, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a network node 12 such as a MME, AMF, IAB-donor node, baseband unit (BBU) such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a stand-alone access point or any other network unit or node capable of communicating with a UE within the area served by the radio network node depending e.g. on a first radio access technology and terminology used. It should be noted that a service area may be denoted as cell, beam, beam group or similar to define an area of radio coverage.

The wireless communications network 1 further comprises a first radio network node 13 connected in-between the network node 12 and the UE 10 relaying data packets between the network node 13 and the UE 10. The first radio network node 13 may be an IAB node such as an IAB-donor such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a UE within the area served by the radio network node depending e.g. on a first radio access technology and terminology used. It should be noted that a service area may be denoted as cell, beam, beam group or similar to define an area of radio coverage.

The wireless communications network further comprises a second radio network node 14 connected in-between the first radio network node 13 and the UE 10, relaying data packets between the first radio network node 13 and the UE 10. The second radio network node 14 may be connected to the UE 10 directly and may be an egress point. The second radio network node 14 may be an IAB node e.g. a radio remote unit (RRU) such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on a first radio access technology and terminology used. It should be noted that a service area may be denoted as cell, beam, beam group or similar to define an area of radio coverage. The second radio network node 14 is an example of a source radio network node 140 handling one or more UEs such as IAB-MTs or similar.

The wireless communications network further comprises a third radio network node 15 connected in-between the network node 12 and the UE 10. The third radio network node 15 may be an egress point. The third radio network node 15 may be an IAB node e.g. a radio remote unit (RRU) such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending. The third radio network node 15 is an example of a target radio network node 150 handling handover or cell selection of one or more UEs such as IAB-MTs or similar.

Embodiments herein disclose a solution wherein any network node involved in a handover or a cell selection of the UE 10 transmits, e.g. during communication, a message comprising one or more first UP indications indicating whether UP communication for the UE should be setup or not. The messages comprising the first UP indication may be: messages used in the Handover Resource Allocation and Initial Context Setup S1AP procedures; messages used in the Handover Preparation and Handover Resource Allocation NGAP procedures; messages used in the Handover Preparation, SeNB Addition Preparation, Retrieve UE Context and SgNB Addition Preparation X2AP procedures; and/or messages used in the Handover Preparation and S-NG-RAN node Addition Preparation XnAP procedures.

As stated above, even though the user plane establishment for an IAB-MT/UE is optional, the information elements (IE) related to user plane establishment cannot be omitted from the messages used to enable IAB-MT operation, as these IEs are mandatory due to the reuse of legacy messages.

The first solution proposed herein introduces a new IE, i.e. a first UP indication such as an IE named UP to be Setup, which will indicate if the mandatory IEs for the UP setup should be ignored. This means that the UP setup-related IEs are still included in the message; however, the recipient of these IEs should ignore them and will not take any other action with respect to UP setup. The first UP indication may be an indication of user plane setup or not, or an indication of avoiding user plane setup.

The new UP to be Setup IE, i.e., the first UP indication, can be mandatory or optional, because it is added in messages where the IEs for UP setup are mandatory:

If the new IE is mandatory and if the UP is to be set up for the IAB-MT, the value of the new IE is set to "true", otherwise it is set to "false".

If the new IE is optional, it can be absent if the UP is set up, and present with value "false" if the UP is not to be set up for the IAB-MT.

The messages carrying the first UP indication may be one or more of the following: messages used in the Handover Resource Allocation and Initial Context Setup S1AP procedures; messages used in the Handover Preparation and Handover Resource Allocation NGAP procedures; messages used in the Handover Preparation, SeNB Addition Preparation, Retrieve UE Context and SgNB Addition Preparation X2AP procedures; and/or the messages used in the Handover Preparation and S-NG-RAN node Addition Preparation XnAP procedures.

Given the IAB-MT is operator's owned equipment deployed and operating in operator's owned network, the operator can reserve/use first UP indications such as special identities, i.e. values not in the range defined by 3GPP, for user plane setup parameters, e.g. PDU Session IDs, E-UTRAN Radio Access Bearer (E-RAB) IDs or DRB IDs, so that receiver of the message that includes such special identities will not setup the user plane, i.e. it will simply ignore the information related to user plane resources. In a subcase of the second solution, the operator can use the special identity just for the very first parameter, i.e., first parameter to be decoded by the receiver, of the user plane setup, and hence when the receiver (of the message) finds that special value, being an example of the first UP indication, for the first parameter the receiver will ignore the rest of the user plane setup parameters irrespective of their values. Receiver herein meaning the target radio network node.

The solution 1 is exemplified on a non-limiting example of HANDOVER REQUEST XnAP message (used in the Handover Preparation XnAP procedure), as shown below (new parts are underlined):

9.1.1.1 Handover Request

This message is sent by the source NG-RAN node to the target NG-RAN node to request the preparation of resources for a handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID reference | M | | NG-RAN node UE XnAP ID 9.2.3.16 | Allocated at the source NG-RAN node | YES | reject |
| Cause | M | | 9.2.3.2 | | YES | reject |
| Target Cell Global ID | M | | 9.2.3.25 | Includes either an E-UTRA CGI or an NR CGI | YES | reject |

-continued

| IE/Group Name | Presence | Range | IE type and reference | Semantics description | Criticality | Assigned Criticality |
|---|---|---|---|---|---|---|
| GUAMI | M | | 9.2.3.24 | | YES | reject |
| UE Context Information | | 1 | | | YES | reject |
| >NG-C UE associated Signalling reference | M | | AMF UE NGAP ID 9.2.3.26 | Allocated at the AMF on the source NG-C connection. | — | |
| Signalling TNL association address at source NG-C side | M | | CP Transport Layer Information 9.2.3.31 | This IE indicates the AMF's IP address of the SCTP association used at the source NG-C interface instance. Note: If no UE TNLA binding exists at the source NG-RAN node, the source NG-RAN node indicates the TNL association address it would have selected if it would have had to create a UE TNLA binding. | — | |
| >UE Security Capabilities | M | | 9.2.3.49 | | — | |
| >AS Security Information | M | | 9.2.3.50 | | — | |
| >Index to RAT/Frequency Selection Priority | O | | 9.2.3.23 | | — | |
| >UE Aggregate Maximum Bit Rate | M | | 9.2.3.17 | | — | |
| >PDU Session Resources To Be Setup List | | 1 | 9.2.1.1 | Similar to NG-C signalling, containing UL tunnel information per PDU Session Resource; and in addition, the source side QoS flow ⇔ DRB mapping | — | |
| >UP To be Setup | O (but can be M as well) This IE can be either mandatory or optional. If O (=optional), if we have DRBs, it can be absent. If we do not have DRBs, it must be present and set to false. If M (=mandatory), its value shows if th~~e~~ _PDU Session resources to be setup List_ IE can be ignored. | | ENUMERATED (true, false, . . .) | If the value of this IE is set to "false", the content of the _PDU Session Resources To Be Setup List_ IE shall be ignored. | | |
| >RRC Context | M | | OCTET STRING | Either includes the _HandoverPreparationInformation_ message as defined in subclause 10.2.2. of TS 36.331 [14], if the target NG-RAN node is an ng-eNB, or the _HandoverPreparationInformation_ message as defined in subclause 11.2.2 of TS 38.331 [10], if the target NG-RAN node is a gNB. | — | |
| >Location Reporting Information | O | | 9.2.3.47 | Includes the necessary parameters for location reporting. | — | |
| >Mobility Restriction List | O | | 9.2.3.53 | | — | |
| >5GC Mobility Restriction List Container | O | | 9.2.3.100 | | YES | ignore |
| Trace Activation | O | | 9.2.3.55 | | YES | ignore |
| Masked IMEISV | O | | 9.2.3.32 | | YES | ignore |

-continued

| IE/Group Name | Presence | Range | IE type and reference | Semantics description | Criticality | Assigned Criticality |
|---|---|---|---|---|---|---|
| UE History Information | M | | 9.2.3.64 | | YES | ignore |
| UE Context Reference at the S-NG-RAN node | O | | | | YES | ignore |
| >Global NG-RAN Node ID | M | | 9.2.2.3 | | — | |
| >S-NG-RAN node UE XnAP ID | M | | NG-RAN node UE XnAP ID 9.2.3.16 | | — | |

The solution 2 is exemplified on a non-limiting example of HANDOVER REQUEST XnAP message (used in the Handover Preparation XnAP procedure), as shown below, by using a reserved/dedicated PDU Session ID value as the first UP indication (underlined in 9.2.1.1 PDU Session Resources To Be Setup List (see below)) to indicate that PDU Session Resources To Be Setup List shall be ignored by the target.

9.2.1.1 PDU Session Resources to be Setup List

This IE contains PDU session resource related information used at UE context transfer between NG-RAN nodes.

| IE/Group Name | Presence | Range | IE type and reference | Semantics description | Criticality | Assigned Criticality |
|---|---|---|---|---|---|---|
| PDU Session Resources To Be Setup List | | 1 | | | — | |
| >PDU Session Resources To Be Setup Item | | 1 ... <maxnoofPDUsessions> | | | — | |
| >>PDU Session ID | M | | 9.2.3.18 | | — | |
| >>S-NSSAI | M | | 9.2.3.21 | | — | |
| >>PDU Session Resource Aggregate Maximum Bitrate | O | | PDU Session Aggregate Maximum Bit Rate 9.2.3.69 | This IE shall be present when at least one Non-GBR QoS Flow has been setup. | — | |
| >>UL NG-U UP TNL Information at UPF | M | | UP Transport Layer Information 9.2.3.30 | UPF endpoint of the NG-U transport bearer. For delivery of UL PDUs | — | |
| >>Additional UL NG-U UP TNL Information at UPF List | O | | Additional UP Transport Layer Information 9.2.1.32 | Additional UPF endpoint of the NG-U transport bearer. For delivery of UL PDUs | YES | ignore |
| >>Source DL NG-U TNL Information | O | | UP Transport Layer Information 9.2.3.30 | Indicates the possibility to keep the NG-U GTP-U tunnel termination point at the target NG-RAN node. | — | |
| >>Security Indication | O | | 9.2.3.52 | | — | |
| >>PDU Session Type | M | | 9.2.3.19 | | — | |
| >>Network Instance | O | | 9.2.3.85 | This IE is ignored if the *Common Network Instance* IE is present. | — | |
| >>QoS Flows To Be Setup List | | 1 | | | — | |
| >>>QoS Flows To Be Setup Item | | 1 ... <maxnoofQoSFlows> | | | — | |
| >>>>QoS Flow Identifier | M | | 9.2.3.10 | | — | |
| >>>>QoS Flow Level QoS Parameters | M | | 9.2.3.5 | | — | |
| >>>>E-RAB ID | O | | INTEGER (0 ... 15, ...) | | — | |

-continued

| IE/Group Name | Presence | Range | IE type and reference | Semantics description | Criticality | Assigned Criticality |
|---|---|---|---|---|---|---|
| >>Data Forwarding and Offloading Info from source NG-RAN node | O | | 9.2.1.17 | | — | |
| >> Common Network Instance | O | | 9.2.3.92 | | YES | ignore |

| Range bound | Explanation |
|---|---|
| maxnoofPDUSessions | Maximum no. of PDU sessions. Value is 256 |
| maxnoofQoSFlows | Maximum no. of QoS flows allowed within one PDU session. Value is 64. |

Figure 3:
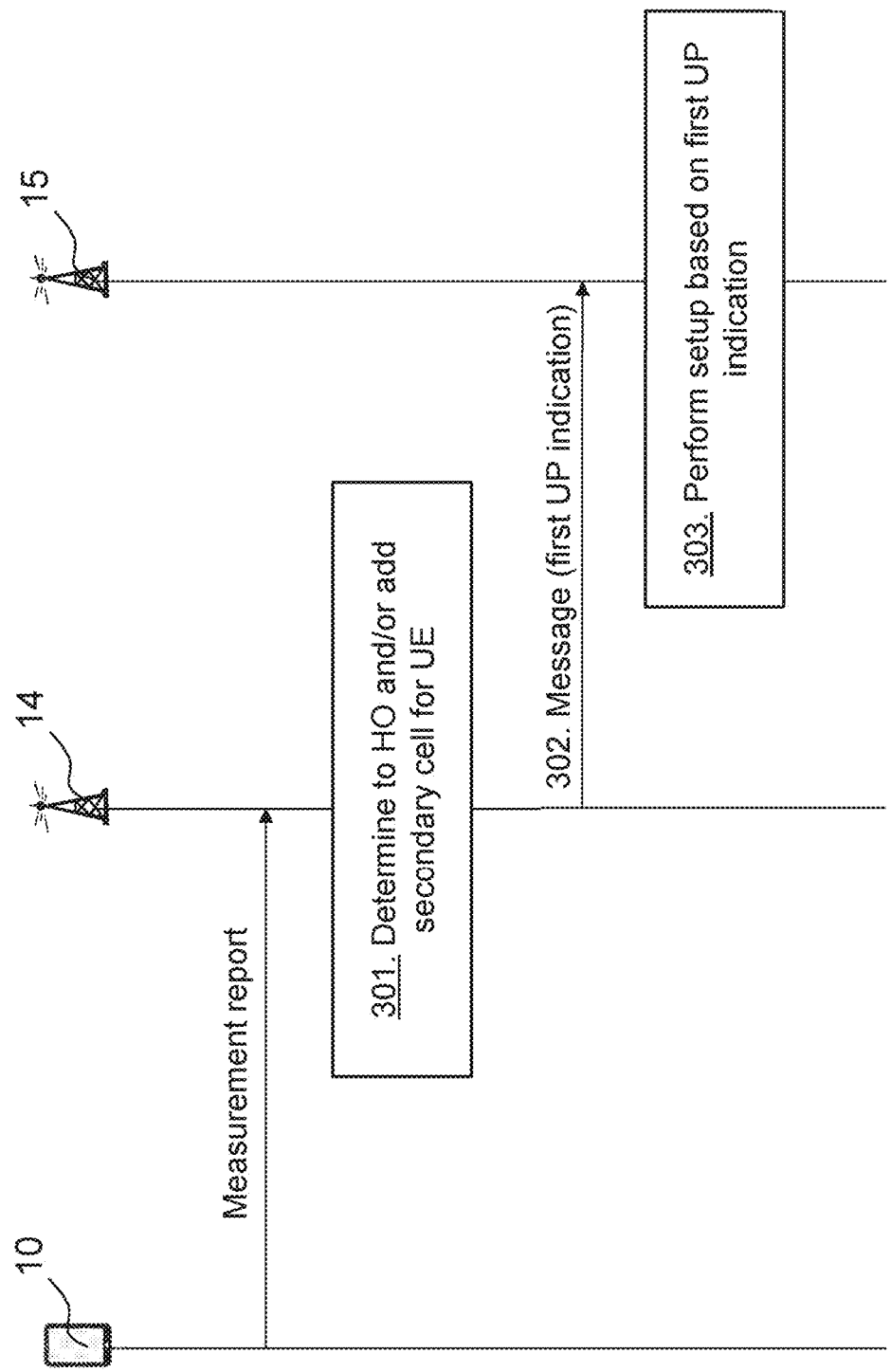
FIG. 3 is a combined signalling scheme and flowchart according to some embodiments herein.

FIG. 3 is a combined signalling scheme and flowchart depicting some embodiments herein wherein the UE is exemplified as an IAB-MT or IAB-UE, and the radio network nodes 14 and 15 are exemplified as eNodeBs and/or gNBs.

Action 301. The second radio network node 14, being an example of the source radio network node 140, may determine to perform a handover of the UE 10 to the third radio network node 15 being an example of the target radio network node 150. E.g. based on measurement reports or similar from the UE 10.

Action 302. According to embodiments herein the second radio network node 14 transmits a message related to handover or a cell selection to the third radio network node 15, for the UE 10. The message comprises the first UP indication, wherein the first UP indication indicates use of UP communication or not. That is, the first UP indication indicates whether UP communication for the UE 10 should be setup or not.

Action 303. The third radio network node 15 receives the message and based on the first UP indication performs a setup of a connection, e.g. avoids set up of UP connection if the first UP indication indicates not to use UP communication. This may be beneficial when the UE 10 is an IAB-MT and the message is a legacy messages reused for the IAB-MT for which message the presence of information elements (IE) related to user plane establishment is mandatory.

Figure 4:
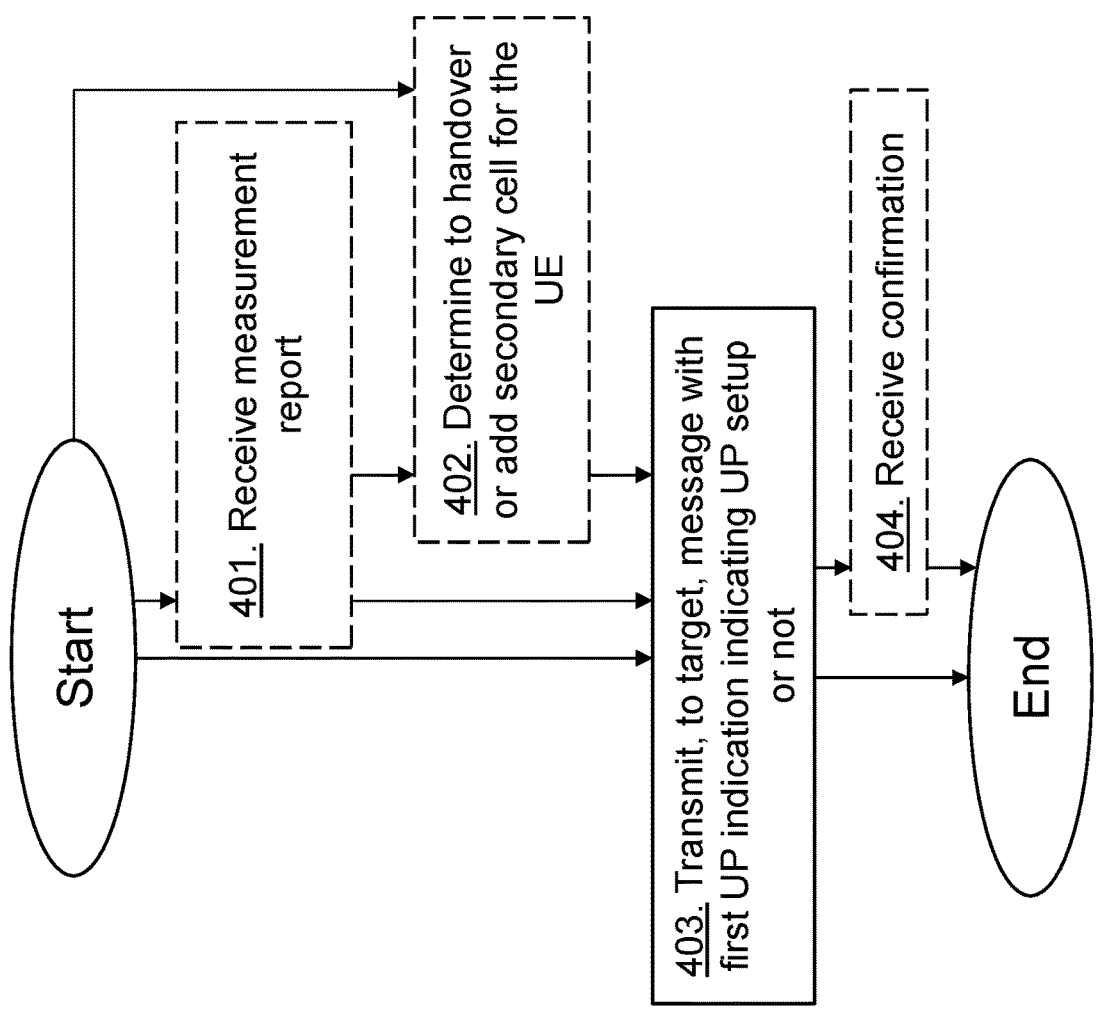
FIG. 4 is a schematic flowchart depicting a method performed by a source radio network node according to embodiments herein.

The method actions performed by the source radio network node 140, such as an IAB node e.g. the second radio network node 14, for handling communication and/or connection setup in the wireless communications network 1 according to embodiments herein will now be described with reference to a flowchart depicted in FIG. 4. The wireless communications network 1 may comprise the first radio network node 13, the second radio network node 14 and/or the third radio network node 15 relaying data packets between the network node 12 and the UE 10. The first radio network node 13 may be an intermediate network node between the source radio network node 140 and the network node 12. The source radio network node 140 is adapted to relay data packets between the first radio network node 13 and the UE 10 in the wireless communications network.

Action 401. The source radio network node 140 may receive a measurement report from the UE and/or another radio network node. The source radio network node 140 may thus obtain a cell indication from the UE 10 and/or another radio network node, wherein the cell indication indicates the handover or the cell selection of the UE 10 (secondary cell addition).

Action 402. The source radio network node 140 may determine to handover the UE 10 to a target radio network node, and/or to add a secondary cell for the UE based on the cell indication. The source radio network node 140 may determine to handover the UE 10 to a different radio network node such as the third radio network node 15 e.g. based on measurement report(s). Alternatively or additionally, the source radio network node 140 may determine to add a secondary cell for the UE 10 e.g. based on the measurement report.

Action 403. The source radio network node 140 such as the second radio network node 14 transmits to the target radio network node 150 a message relating to the cell selection and/or the handover for the UE, wherein the message comprises the first UP indication. The first UP indication is an indication of setting up a user plane communication or not for the UE. The target radio network node 150 may comprise the third radio network node 15, the first radio network node 13, and/or an intermediate radio network node. Thus, the source radio network node 140 may transmit to a radio network node such as the network node 12, the first 13 and/or the third radio network node 15, begin examples of a target radio network node, the message comprising the first UP indication, wherein the first UP indication may be an indication of user plane setup or not, or an indication of avoiding user plane setup. The message may be: a message in a Handover Resource Allocation and Initial Context Setup S1 application protocol procedure; a message used in a Handover Preparation and Handover Resource Allocation NG application protocol procedure; a message used in a Handover Preparation, a secondary nodeB, NB, Addition Preparation, a Retrieve UE Context and secondary gNB Addition Preparation X2 application protocol procedure; and/or a message used in a Handover Preparation and Secondary-NG-radio access network node Addition Preparation Xn application protocol procedure. The first UP indication may comprise one or more of the following: a value not in a range defined by 3GPP; a PDU Session ID; an E-RAB ID; a DRB ID, so that receiver of the message that includes such value or identities will not setup the user plane communication. The first UP indication may comprise a first parameter of a UP setup to be decoded by a receiver of the message, and the receiver may then ignore the rest of the UP setup parameters irrespective of their values when the first parameter indicates that UP communication should not be set up. The message may be a HANDOVER REQUEST XnAP message and the first UP indication may comprise a PDU Session ID value to indicate that PDU Session Resources To Be Setup List shall be ignored by the target radio network node. The message may be a HANDOVER REQUEST XnAP message and the first UP indication may comprise an information element to indicate that PDU Session Resources To Be Setup List shall be ignored or not be ignored by the target radio network node.

Action 404. The source radio network node 140 may further receive a confirmation from the target radio network node 150 receiving the message.

Figure 5:
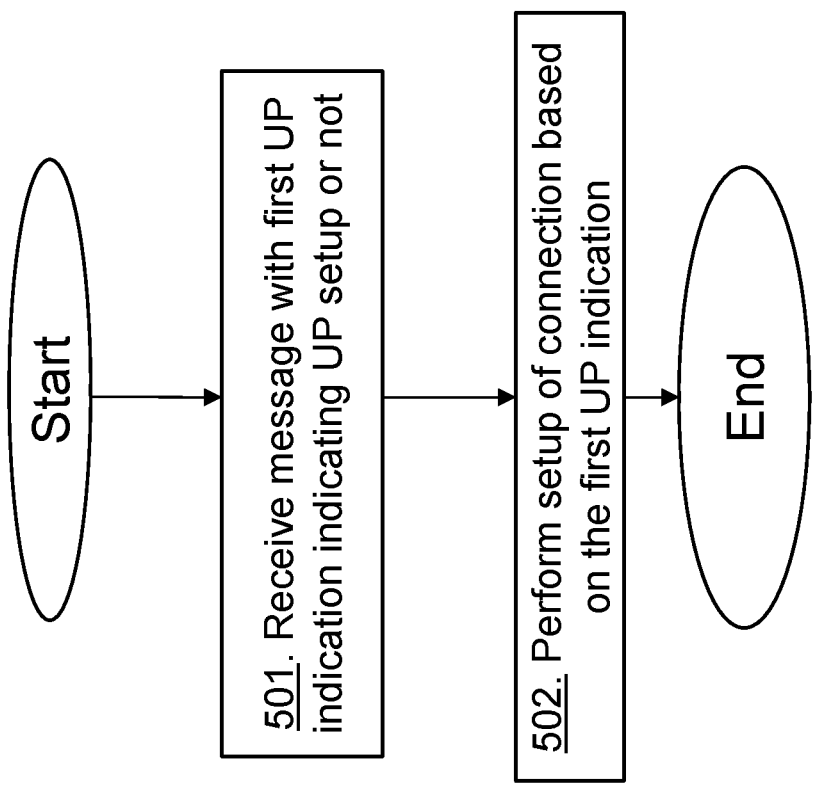
FIG. 5 is a schematic flowchart depicting a method performed by a target radio network node according to embodiments herein.

The method actions performed by the target radio network node 150, such as an IAB node for example, the third radio network node 15, for handling or managing communication and/or connection setup in a wireless communications network 1 according to embodiments herein will now be described with reference to a flowchart depicted in FIG. 5. The wireless communications network 1 comprises the source radio network node 140 relaying data packets between the first radio network node 13 and the UE 10. Thus, the wireless communications network 1 may comprise the first radio network node 13, the second radio network node 14 and/or the third radio network node 15 relaying data packets between a central network node, such as the network node 12, and a UE. The first radio network node 13 may be an intermediate network node between the second radio network node 14 and the central network node. The target radio network node 150 may comprise an IAB donor node, or an intermediate radio network node.

Action 501. The target radio network node 150 receives from the source radio network node 140 or the first radio network node 13 a message relating to a cell selection or a handover for the UE 10. The message comprises the first UP indication, wherein the first UP indication is an indication of setting up a user plane communication or not for the UE. The first UP indication may indicate to avoid to setup UP connection e.g. may be an indication of avoiding user plane setup. The message may be: a message in a Handover Resource Allocation and Initial Context Setup S1 application protocol procedure; a message used in a Handover Preparation and Handover Resource Allocation NG application protocol procedure; a message used in a Handover Preparation, a secondary nodeB, NB, Addition Preparation, a Retrieve UE Context and secondary gNB Addition Preparation X2 application protocol procedure; and/or a message used in a Handover Preparation and Secondary-NG-radio access network node Addition Preparation Xn application protocol procedure. The first UP indication may comprise one or more of the following: a value not in a range defined by 3GPP; a PDU Session ID; an E-RAB ID; a DRB ID, so that the target radio network node receiving the message that includes such value or identities will not setup the user plane communication. The first UP indication may comprise a first parameter of a user plane setup to be decoded by the target radio network node receiving the message, and the target radio network node will ignore the rest of the user plane setup parameters irrespective of their values when the first parameter indicates that UP communication should not be set up. The message received may be a HANDOVER REQUEST XnAP message and the first UP indication may comprise the PDU Session ID value to indicate that PDU Session Resources To Be Setup List shall be ignored by the target radio network node. The message may be a HANDOVER REQUEST XnAP message and the first UP indication may comprise an information element to indicate that PDU Session Resources To Be Setup List shall or shall not be ignored by the target radio network node.

Action 502. The target radio network node 150 performs a setup of a connection for the UE 10 based on the first UP indication, e.g. will not setup the user plane communication. For example, the target radio network node 150 may not setup the user plane communication by ignoring the information related to user plane resources.

The solutions mentioned here may be implemented in an NR unlicensed spectrum but are not limited to NR unlicensed spectrum (NR-U) scenarios. Embodiments are also applicable to other unlicensed operation scenarios such as LTE Licensed assisted access (LAA)/enhanced LAA/further enhanced LAA or WiFi.

Figure 6:
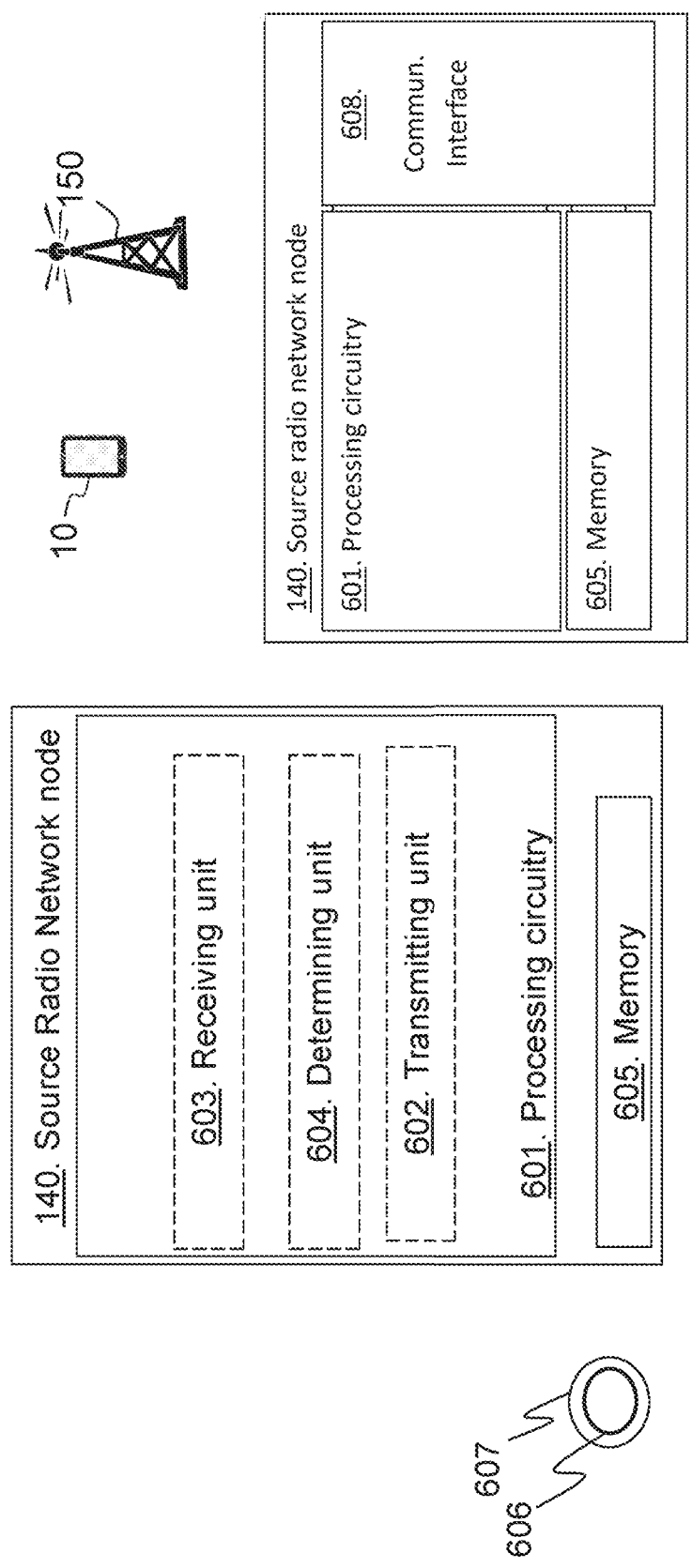
FIG. 6 is a block diagram depicting source radio network nodes according to embodiments herein.

FIG. 6 is a block diagram depicting source radio network nodes in two embodiments, for handling communication of the UE 10 in the wireless communications network 1 according to embodiments herein. The source radio network node 140 is adapted to relay data packets between the first radio network node 13 and the UE 10 in the wireless communications network 1.

The source radio network node 140 may comprise processing circuitry 601, e.g. one or more processors, configured to perform the methods herein.

The source radio network node 140 may comprise a transmitting unit 602, e.g. a transmitter or a transceiver. The source radio network node 140, the processing circuitry 601, and/or the transmitting unit 602 is configured to transmit to the target radio network node 150 the message relating to the cell selection and/or the handover for the UE 10, wherein the message comprises the first UP indication. The first UP indication is an indication of setting up a user plane communication or not for the UE 10. Thus, configured to transmit to another radio network node such as the first and/or the third radio network node 15 the message comprising the first UP indication, wherein the first UP indication may be an indication of avoiding user plane setup. The target radio network node 150 may comprise the third radio network node 15, the first radio network node 13, or an intermediate radio network node. The message may be: a message in a Handover Resource Allocation and Initial Context Setup S1 application protocol procedure; a message used in a Handover Preparation and Handover Resource Allocation NG application protocol procedure; a message used in a Handover Preparation, a secondary nodeB, NB, Addition Preparation, a Retrieve UE Context and secondary gNB Addition Preparation X2 application protocol procedure; and/or a message used in a Handover Preparation and Secondary-NG-radio access network node Addition Preparation Xn application protocol procedure. The first user plane indication may comprise one or more of the following: a value not in a range defined by 3GPP; a PDU Session ID; an E-RAB ID; a DRB ID, so that receiver of the message that includes such a value or identities will not setup the user plane communication. The first UP indication may comprise the first parameter of the user plane setup to be decoded by the receiver of the message, and the receiver will ignore the rest of the user plane setup parameters irrespective of their values when the first parameter indicates that UP communication should not be set up. The message may be a HANDOVER REQUEST XnAP message and the first user plane indication may comprise a PDU Session ID value to indicate that PDU Session Resources To Be Setup List shall be ignored by the target radio network node. The message may be a HANDOVER REQUEST XnAP message and the first UP indication may comprise an information element to indicate that PDU Session Resources To Be Setup List shall or shall not be ignored by the target radio network node 150.

The source radio network node 140 may comprise a receiving unit 603, e.g. a receiver or a transceiver. The source radio network node 140, the processing circuitry 601, and/or the receiving unit 603 may be configured to receive a measurement report from the UE 10.

The source radio network node 140 may comprise a determining unit 604. The source radio network node 140, the processing circuitry 601, and/or the determining unit 604 may be configured to determine to handover the UE 10 to the target radio network node 150, e.g. an IAB-node, and/or to add a secondary cell for the UE 10 based on a cell indication, e.g. based on the received report.

The source radio network node 140 further comprises a memory 605. The memory 605 comprises one or more units to be used to store data on, such as measurement report, radio network node IDs, first UP indications and applications to perform the methods disclosed herein when being executed, and similar. Furthermore, the source radio network node 140 may comprise a communication interface 608 such as comprising a transmitter, a receiver and/or a transceiver.

The methods according to the embodiments described herein for the source radio network node 140 may respectively be implemented by means of e.g. a computer program product 606 or a computer program, comprising instructions, i.e., software code portions, which, when executed on at least one processor, cause the at least one processor to carry out the actions described herein, as performed by the source radio network node 140. The computer program product 606 may be stored on a computer-readable storage medium 607, e.g. a disc, a universal serial bus (USB) stick or similar. The computer-readable storage medium 607, having stored thereon the computer program product, may comprise the instructions which, when executed on at least one processor, cause the at least one processor to carry out the actions described herein, as performed by the source radio network node 140. In some embodiments, the computer-readable storage medium may be a transitory or a non-transitory computer-readable storage medium. Thus, embodiments herein may disclose a source radio network node 140 for handling communication in a wireless communications network, wherein the source radio network node 140 comprises processing circuitry 601 and a memory 605, said memory 605 comprising instructions executable by said processing circuitry 601 whereby said source radio network node 140 is operative to perform any of the methods herein.

Figure 7:
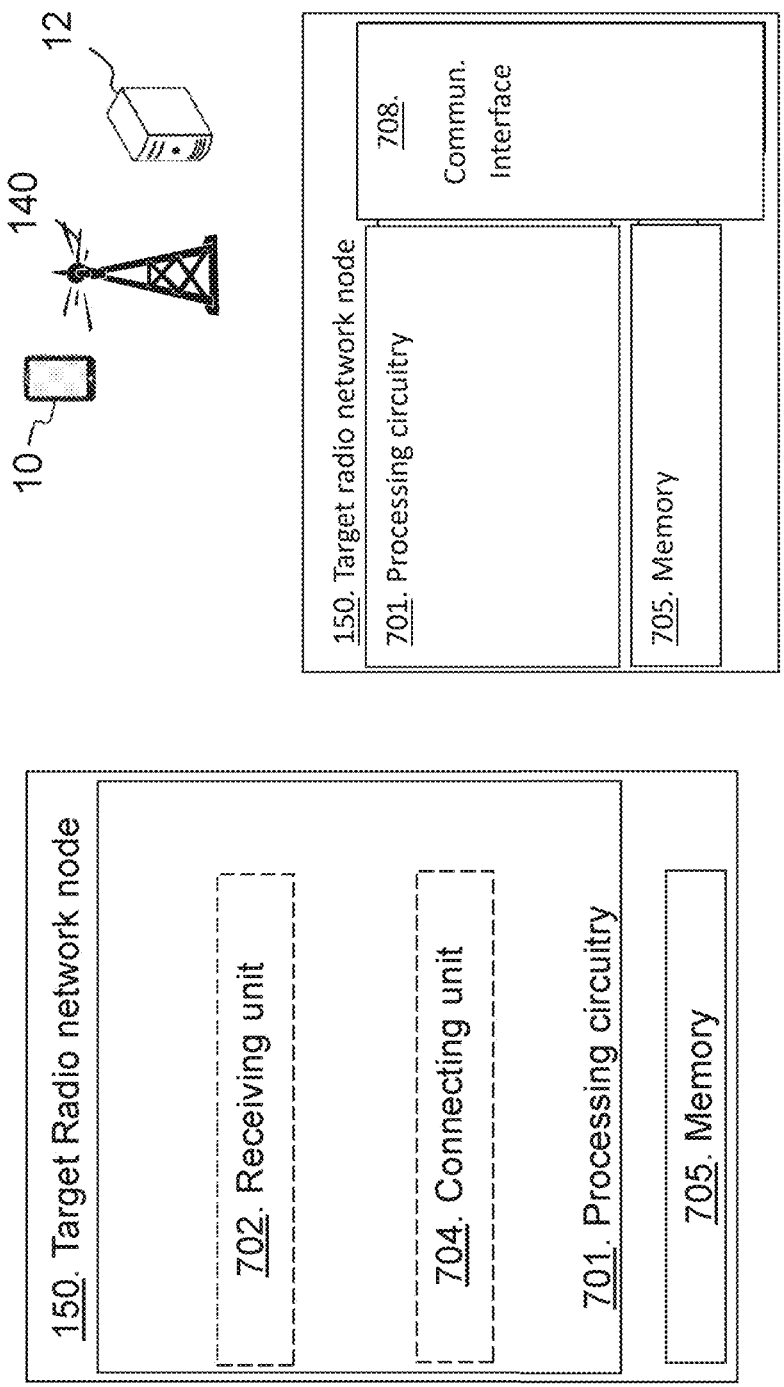
FIG. 7 is a block diagram depicting target radio network nodes according to embodiments herein.

FIG. 7 is a block diagram depicting the target radio network node 150, such as the first radio network node 13, the second radio network node 14, and the third radio network node 15, in two embodiments, such as a relay node and/or an IAB node, for handling data packets or handling communication of the UE 10 in the wireless communications network 1 according to embodiments herein. The wireless communications network 1 comprises the source radio network node 140 relaying data packets between the first radio network node 13 and the UE 10. The target radio network node 150 may comprise the first radio network node 13, such as an IAB donor node, or an intermediate radio network node.

The target radio network node 150 may comprise processing circuitry 701, e.g. one or more processors, configured to perform the methods herein.

The target radio network node 150 may comprise a receiving unit 702, e.g. a receiver or a transceiver. The target radio network node 150, the processing circuitry 701, and/or the receiving unit 702 is configured to receive from the source radio network node 140 or the first radio network node 13, being an intermediate radio network node, the message relating to the cell selection or the handover for the UE 10. The message comprises the first UP indication, wherein the first UP indication is an indication of setting up a user plane communication or not for the UE 10. For example, the target radio network node 140 may receive from another radio network node such as the network node 12, the second radio network node 14, the source radio network node 140, the message relating to handover of the UE or cell selection, wherein the message comprises the first UP indication of avoiding user plane setup. The message may be: a message in a Handover Resource Allocation and Initial Context Setup S1 application protocol procedure; a message used in a Handover Preparation and Handover Resource Allocation NG application protocol procedure; a message used in a Handover Preparation, a secondary nodeB, NB, Addition Preparation, a Retrieve UE Context and secondary gNB Addition Preparation X2 application protocol procedure; and/or a message used in a Handover Preparation and Secondary-NG-radio access network node Addition Preparation Xn application protocol procedure. The first UP indication may comprise one or more of the following: a value not in a range defined by 3GPP; a protocol data unit, PDU, Session ID; an E-RAB ID; a DRB ID, so that the target radio network node receiving the message that includes such value or identities will not setup the user plane communication. The first UP indication may comprise the first parameter of a user plane setup to be decoded by the target radio network node receiving the message, and the target radio network node 150 is configured to ignore the rest of the user plane setup parameters irrespective of their values when the first parameter indicates that UP communication should not be set up. The message may be a HANDOVER REQUEST XnAP message and the first UP indication comprises a PDU Session ID value to indicate that PDU Session Resources To Be Setup List shall be ignored by the target radio network node. The message may be a HANDOVER REQUEST XnAP message and the first UP indication may comprise an information element to indicate that PDU Session Resources To Be Setup List shall or shall not be ignored by the target radio network node.

The target radio network node 150 may comprise a connecting unit 704. The target radio network node 150, the processing circuitry 701, and/or the connecting unit 704 is configured to perform the setup of a connection for the UE 10 based on the first UP indication. The target radio network node 150, the processing circuitry 701, and/or the connecting unit 704 may be configured to perform the setup by not setting up user plane connection when the first UP indication indicates not setting up UP communication. The target radio network node 150, the processing circuitry 701, and/or the connecting unit 704 may be configured to not setup the user plane communication by ignoring information related to user plane resources.

The target radio network node 150 further comprises a memory 705. The memory 705 comprises one or more units to be used to store data on, such as first UP indications and applications to perform the methods disclosed herein when being executed, and similar. Furthermore, the target radio network node 150 may comprise a communication interface 708 such as comprising a transmitter, a receiver and/or a transceiver, with one or more antennas.

The methods according to the embodiments described herein for the target radio network node 150 are respectively implemented by means of e.g. a computer program product 706 or a computer program, comprising instructions, i.e., software code portions, which, when executed on at least one processor, cause the at least one processor to carry out the actions described herein, as performed by the target radio network node 150. The computer program product 706 may be stored on a computer-readable storage medium 707, e.g. a disc, a universal serial bus (USB) stick or similar. The computer-readable storage medium 707, having stored thereon the computer program product, may comprise the instructions which, when executed on at least one processor, cause the at least one processor to carry out the actions described herein, as performed by the target radio network node 150. In some embodiments, the computer-readable storage medium may be a transitory or a non-transitory computer-readable storage medium. Thus, embodiments herein may disclose a target radio network node 150 for handling communication or control signalling in a wireless communications network, wherein the target radio network node 150 comprises processing circuitry and a memory, said memory comprising instructions executable by said processing circuitry whereby said target radio network node 150 is operative to perform any of the methods herein.

In some embodiments a more general term "radio network node" is used and it can correspond to any type of radio-network node or any network node, which communicates with a UE, such as a wireless device, and/or with another radio network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UEs are IoT capable device, target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc. Specifically, in embodiments herein a UE may be an IAB-MT part of an IAB node.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

OTT

Figure 8:
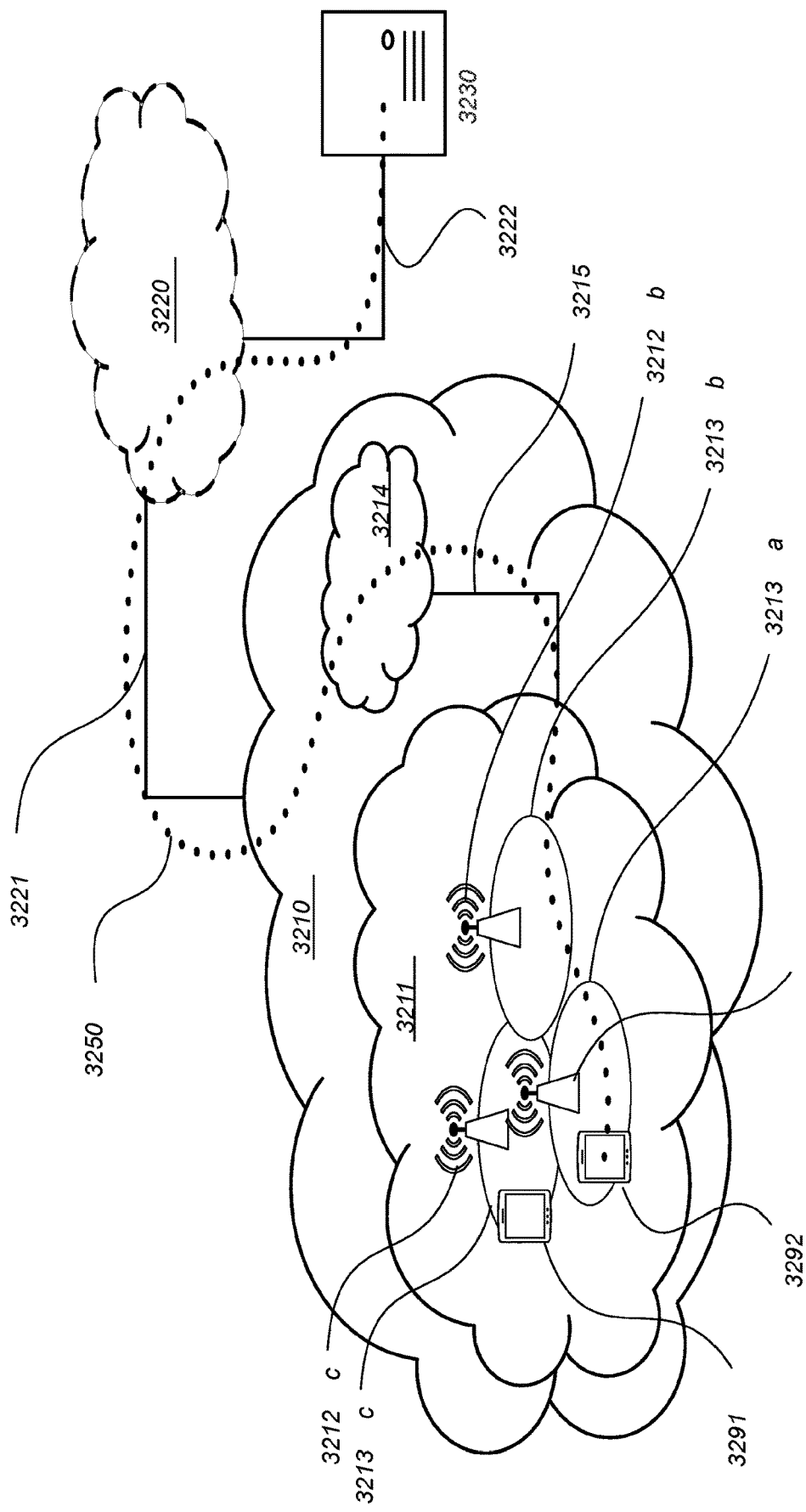
FIG. 8 is a telecommunication network connected via an intermediate network to a host computer in accordance with some embodiments.

FIG. 8 shows a Telecommunication network connected via an intermediate network to a host computer in accordance with some embodiments. With reference to FIG. 8, in accordance with an embodiment, a communication system includes telecommunications network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 8 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 9:
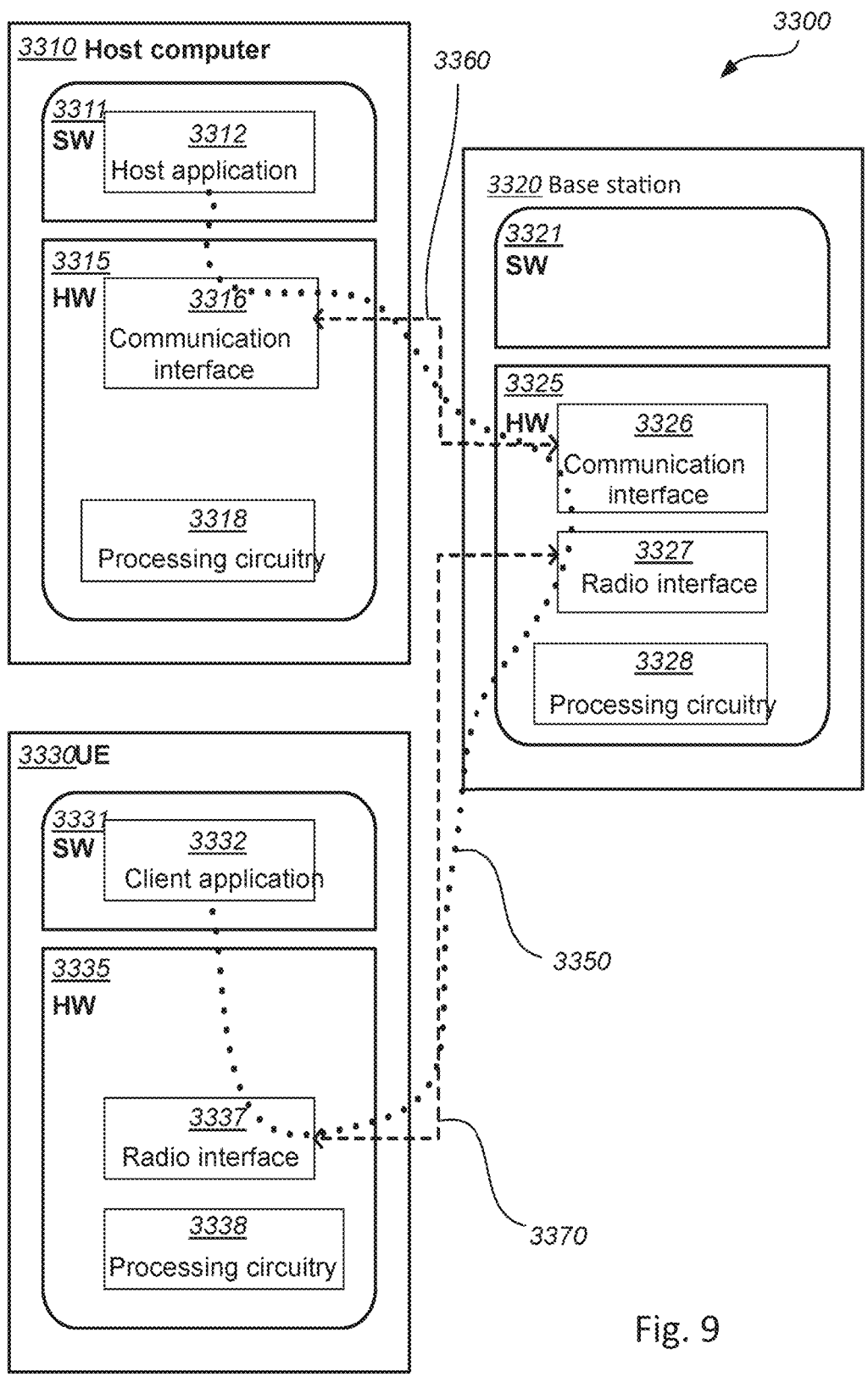
FIG. 9 is a host computer communicating via a base station with a user equipment over a partially wireless connection in accordance with some embodiments.

FIG. 9 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 9. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 9) served by base station 3320. Communication interface 3326 may be configured to facilitate connection 3360 to host computer 3310. Connection 3360 may be direct or it may pass through a core network (not shown in FIG. 9) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 9 may be similar or identical to host computer 3230, one of base stations 3212a, 3212b, 3212c and one of UEs 3291, 3292 of FIG. 8, respectively. This is to say, the inner workings of these entities may be as shown in FIG. 9 and independently, the surrounding network topology may be that of FIG. 8.

In FIG. 9, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to perform handover or cell selection without UP communication. Thereby the data communication, e.g. the handling or managing setup of communication may be performed efficiently resulting in better responsiveness and battery time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 10 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 11 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 12 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 13 show methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 13 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviation Explanation

ACK (positive) Acknowledgment
AUL Autonomous uplink
BLER Block error rate
BWP Bandwidth Part
CAPC Channel access priority class
CBG Code block group
CCA Clear channel assessment
CO Channel occupancy
COT Channel occupancy time
CWS Contention window size
DL Downlink
ED Energy detection eNB 4G base station
gNB 5G base station
HARQ Hybrid automatic repeat request
IS In synch
LAA Licensed assisted access
LBT Listen before talk
MAC Medium access control
MCOT Maximum channel occupancy time
NACK Negative acknowledgment
NDI New data indicator
NR 3GPP defined 5G radio access technology
NR-U NR unlicensed
OOS out of synch
PCell Primary cell
PCI Physical cell identity
PDCCH A downlink control channel
PDU Protocol data unit
PHICH Physical channel Hybrid ARQ Indicator Channel
PLMN Public land mobile network
PSCell Primary SCG cell
PUCCH Physical Uplink Control Channel
PUSCH Physical Uplink Shared Channel
QCI QoS class identifier
QoS Quality of service
RAT Radio access technology
RLF Radio link failure
RLM Radio link monitoring
RLC Radio link control
RRC Radio resource control
RS Reference signal
SCG Secondary cell group
SDU Service data unit
SMTC SSB-based measurement timing configuration
SpCell Special cell (PCell or PSCell)
SPS Semi persistent scheduling
TTI Transmission time interval
UCI Uplink Control Information
UE User equipment
UL Uplink

The invention claimed is:

1. A method performed by source radio network node adapted to relay data packets between a first radio network node and a user equipment (UE) in a wireless communications network, the method comprising:
transmitting, to a target radio network node in the wireless communications network, a message relating to a cell selection and/or a handover for the UE, wherein the message comprises a first user plane indication indicating whether or not user plane communication should be setup for the UE.

2. The method according to claim 1, wherein the target radio network node comprises a third radio network node, the first radio network node, or an intermediate radio network node.

3. The method according to claim 1, wherein the message is part of one of the following:
Handover Resource Allocation and Initial Context Setup procedure in S1 application protocol;
Handover Preparation and Handover Resource Allocation procedure in NG application protocol;
at least one of the following procedures in X2 application protocol: Handover Preparation, Secondary NodeB Addition Preparation, Retrieve UE Context, and Secondary gNB Addition Preparation; or
Handover Preparation and Secondary-NG-radio access network node Addition Preparation procedure in Xn application protocol.

4. The method according to claim 1, wherein the first user plane indication comprises one or more of the following, which indicates that a user plane communication should not be setup for the UE: a value not in a range of values defined by 3GPP; a protocol data unit (PDU) Session ID; an E-UTRAN Radio Access Bearer (E-RAB) ID; a data radio bearer (DRB) ID.

5. The method according to claim 1, wherein:
the first user plane indication comprises a first user plane setup parameter; and
when first user plane setup parameter indicates that user plane communication should not be setup for the UE, the first user plane setup parameter further indicates that other user plane setup parameters of the message should be ignored irrespective of their values.

6. The method according to claim 1, wherein:
the message is a HANDOVER REQUEST XnAP message, and
the first user plane indication comprises a protocol data unit (PDU) Session ID value indicating that a PDU Session Resources To Be Setup List should be ignored by the target radio network node.

7. The method according to claim 1, wherein:
the message is a HANDOVER REQUEST XnAP message, and
the first user plane indication comprises an information element indicating whether or not a protocol data unit (PDU) Session Resources To Be Setup List should be ignored by the target radio network node.

8. The method according to claim 1, wherein transmitting the message to the target radio network node is responsive to determining one or more of the following based on a cell indication obtained from the UE or from another radio network node: to handover the UE to the target radio network node, and to add a secondary cell for the UE.

9. A method performed by a target radio network node arranged to handle communication in a wireless communications network that comprises a source radio network node arranged to relay data packets between a first radio network node and a user equipment (UE), the method comprising:
receiving from the source radio network node or the first radio network node a message relating to a cell selection or a handover for the UE, wherein the message comprises a first user plane indication indicating whether or not user plane communication should be setup for the UE; and
performing a setup of a connection for the UE based on the first user plane indication.

10. The method according to claim 9, wherein performing the setup of a connection for the UE based on the first user plane indication comprises refraining from setup of user plane communication for the UE when the first user plane indication indicates that user plane communication should not be setup for the UE.

11. The method according to claim 10, wherein refraining from setup of user plane communication for the UE comprises ignoring information in the message that relates to user plane resources.

12. The method according to claim 9, wherein the target radio network node comprises one of the following: an integrated access backhaul (IAB) donor node, or an intermediate radio network node.

13. The method according to claim 9, wherein the message is part of one of the following:
Handover Resource Allocation and Initial Context Setup procedure in S1 application protocol;

Handover Preparation and Handover Resource Allocation procedure in NG application protocol;

at least one of the following procedures in X2 application protocol: Handover Preparation, Secondary NodeB Addition Preparation, Retrieve UE Context, and Secondary gNB Addition Preparation; or Handover Preparation and Secondary-NG-radio access network node Addition Preparation procedure in Xn application protocol.

14. The method according to claim 9, wherein the first user plane indication comprises one or more of the following, which indicates that a user plane communication should not be setup for the UE: a value not in a range of values defined by 3GPP; a protocol data unit (PDU) Session ID; an E-UTRAN Radio Access Bearer (E-RAB) ID; a data radio bearer (DRB) ID.

15. The method according to claim 9, wherein:
the first user plane indication comprises a first user plane setup parameter; and
when first user plane setup parameter indicates that user plane communication should not be setup for the UE, the first user plane setup parameter further indicates that other user plane setup parameters of the message should be ignored irrespective of their values.

16. The method according to claim 9, wherein:
the message is a HANDOVER REQUEST XnAP message, and
the first user plane indication comprises a protocol data unit (PDU) Session ID value indicating that a PDU Session Resources To Be Setup List should be ignored by the target radio network node.

17. The method according to claim 9, wherein:
the message is a HANDOVER REQUEST XnAP message, and
the first user plane indication comprises an information element indicating whether or not a protocol data unit (PDU) Session Resources To Be Setup List should be ignored by the target radio network node.

18. A source radio network node adapted to relay data packets between a first radio network node and a user equipment (UE), in a wireless communications network, wherein the source radio network node comprises:
a transceiver configured to communicate with at least a target radio network node in the wireless communication network; and
processing circuitry operably coupled to the transceiver, wherein the processing circuitry and the transceiver are configured to perform operations corresponding to the method of claim 1.

19. The RAN mode of claim 18, wherein the first user plane indication comprises one or more of the following, which indicates that a user plane communication should not be setup for the UE: a value not in a range of values defined by 3GPP; a protocol data unit (PDU) Session ID; an E-UTRAN Radio Access Bearer (E-RAB) ID; a data radio bearer (DRB) ID.

20. A target radio network node arranged to handle communication in a wireless communications network that comprises a source radio network node arranged to relay data packets between a first radio network node and a user equipment (UE), wherein the target radio network node comprises:
a transceiver configured to communicate with at least the source radio network node and the UE; and
processing circuitry operably coupled to the transceiver, wherein the processing circuitry and the transceiver are configured to perform operations corresponding to the method of claim 9.

21. The RAN mode of claim 20, wherein:
the processing circuitry and transceiver are configured to perform the setup of a connection for the UE based on the first user plane indication by refraining from setup of user plane communication for the UE when the first user plane indication indicates that user plane communication should not be setup for the UE; and
the processing circuitry and transceiver are configured to refrain from setup of user plane communication for the UE by ignoring information in the message that relates to user plane resources.

* * * * *